United States Patent [19]

So

[11] Patent Number: 5,422,416
[45] Date of Patent: Jun. 6, 1995

[54] PROCESS FOR THE SYNTHESIS OF POLYBENZAZOLE POLYMERS

[75] Inventor: Ying H. So, Midland, Mich.

[73] Assignee: The Dow Chemical Company, Midland, Mich.

[21] Appl. No.: 267,332

[22] Filed: Jun. 28, 1994

Related U.S. Application Data

[63] Continuation-in-part of Ser. No. 85,531, Jun. 30, 1993, Pat. No. 5,324,808.

[51] Int. Cl.⁶ .............................................. C08G 63/00
[52] U.S. Cl. .................................. 528/179; 528/86; 528/183; 528/186; 528/210; 528/336; 528/337; 528/342; 528/397; 528/422
[58] Field of Search ............... 528/179, 86, 183, 186, 528/210, 336, 337, 342, 397, 422

[56] References Cited

U.S. PATENT DOCUMENTS

| | | | |
|---|---|---|---|
| 4,225,700 | 9/1980 | Wolfe et al. | 528/179 |
| 4,312,976 | 1/1982 | Choe | 528/179 |
| 4,423,202 | 12/1983 | Choe | 528/179 |
| 4,533,692 | 8/1985 | Wolfe et al. | 524/417 |
| 4,533,693 | 8/1985 | Wolfe | 524/417 |
| 4,533,724 | 8/1985 | Wolfe et al. | 528/313 |
| 4,578,432 | 3/1986 | Tsai et al. | 525/432 |
| 4,606,875 | 8/1986 | Chenevey et al. | 264/85 |
| 4,608,427 | 8/1986 | Sweeney et al. | 528/179 |
| 4,703,103 | 10/1987 | Wolfe et al. | 528/179 |
| 4,709,006 | 11/1987 | Tsai et al. | 528/208 |
| 4,766,244 | 8/1988 | Lysenko | 564/418 |
| 4,772,678 | 9/1988 | Sybert et al. | 528/179 |
| 5,235,023 | 8/1993 | So | 528/179 |

FOREIGN PATENT DOCUMENTS

WO8401162  3/1984  WIPO .

*Primary Examiner*—John Kight, III
*Assistant Examiner*—Terressa M. Mosley
*Attorney, Agent, or Firm*—Ann K. Galbraith

[57] ABSTRACT

Described herein is a process for synthesizing polybenzazole polymers comprising: (a) contacting a bis(-trihalomethyl) organic compound with a polyphosphoric acid under reaction conditions sufficient to convert at least about 25 mole percent of the trihalomethyl groups present to carboxylic acid or carboxylate groups, forming a reaction mixture thereby; and (b) contacting the reaction mixture with an aromatic compound having two o-amino-basic moieties under reaction conditions sufficient to form a polybenzazole polymer.

8 Claims, No Drawings

PROCESS FOR THE SYNTHESIS OF POLYBENZAZOLE POLYMERS

This application is a Continuation-in-Part of the application Ser. No. 08/085,531, filed Jun. 30, 1993, now U.S. Pat. No. 5,324,808.

FIELD OF THE INVENTION

The invention relates to the synthesis of polybenzoxazole, polybenzimidazole and polybenzothiazole polymers.

BACKGROUND OF THE INVENTION

Polybenzoxazole (PBO), polybenzimidazole (PBI) and polybenzothiazole (PBT) and related polymers (hereinafter referred to as PBZ or polybenzazole polymers) are known polymers which can be extruded as fibers or films having a high tensile strength and high tensile modulus which are useful for structural applications. It is known in the art to synthesize PBZ polymers by the reaction of a first monomer having a primary amine group and a hydroxyl, thiol or amine group bonded to an aromatic group in an ortho-position with respect to each other, and a second monomer having an "electron-deficient carbon group." See, e.g., Wolfe et al., *Liquid Crystalline Polymer Compositions and Process and Products*, U.S. Pat. No. 4,703,103 (Oct. 27, 1987); Tsai et al., *Method for Making Heterocyclic Block Copolymer*, U.S. Pat. No. 4,578,432 (Mar. 25, 1986); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985) and Wolfe et al., *Liquid Crystalline Polymer Compositions and Process and Products*, U.S. Pat. No. 4,533,692 (Aug. 6, 1985), which are incorporated herein by reference.

In most commonly used monomers, the electron-deficient carbon group is either a carboxylic acid group or a carboxylic acid halide group. For instance, monomers may be 4-hydroxy-5-aminobenzoic acid, terephthalic acid, or terephthaloyl chloride.

SUMMARY OF THE INVENTION

The present invention is a process for synthesizing polybenzazole polymers comprising:

(a) contacting a bis(trihalomethyl) organic compound with polyphosphoric acid under reaction conditions sufficient to convert at least about 25 mole percent of the trihalomethyl groups present to carboxylic acid or carboxylate groups, forming a reaction mixture thereby; and (b) contacting the reaction mixture with an aromatic compound having two o-amino-basic moieties under reaction conditions sufficient to form a polybenzazole polymer.

It has been discovered that mixing the bis(trihalomethyl) organic compound with the polyphosphoric acid and allowing a portion of the trihalomethyl groups to react with the acid prior to the polymerization reaction, provides a method whereby polybenzazole polymers with relatively high molecular weights may be obtained, compared to processes wherein all of the monomers are added to polyphosphoric acid simultaneously, as described in U.S. Pat. No. 5,235,023. It is believed that o-amino-basic groups tend to decompose under polymerization reaction conditions, and when a relatively slow-reacting monomer containing trihalomethyl groups is employed to make the PBZ polymer, the decomposition of the o-amino-basic groups may cause chain termination reactions with monofunctional o-amino-basic monomers and/or reduce the number of reactive o-amino-basic monomers in the polymerization reaction mixture before such monomers can copolymerize. The use of mixtures of polyphosphoric acid and a stronger mineral acid, such as methanesulfonic acid, allows the polymerization reaction to proceed more quickly, but requires the polymerization temperature to be kept at temperatures lower than about 150° C. (to avoid decomposition of such acid), and is more corrosive to the equipment used to make the polymer.

It has also been discovered that when monomers containing trihalomethyl groups are employed to prepare PBZ polymers, conversion of a portion of the trihalomethyl groups present to carboxylic acid or carboxylate groups, prior to contact with o-amino-basic group-containing monomers, allows the polymerization reaction to proceed quickly enough to minimize decomposition of the o-amino-basic groups. Accordingly, higher molecular weight polymers may be obtained by adding the bis(trihalomethyl) organic compounds to the polyphosphoric acid and allowing a portion of the group to convert to carboxylic acid or carboxylate-functional monomers prior to the addition of the o-amino-basic group-containing monomers. These and other advantages of the invention will be apparent from the description which follows.

DETAILED DESCRIPTION OF THE INVENTION

The term "polybenzazole polymer" as used herein refers to a polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each unit contains an oxazole ring bonded to an aromatic group, which need not necessarily be a benzene ring. The term "polybenzoxazole (PBO)" also refers broadly to poly(-phenylene-benzo-bis-oxazole)s and other polymers wherein each unit comprises a plurality of oxazole rings fused to an aromatic group. The same understandings shall apply to the terms polybenzothiazole (PBT) and polybenzimidazole (PBI). As used in this application, the term also encompasses mixtures, copolymers and block copolymers of two or more PBZ polymers, such as mixtures of PBO, PBT and/or PBI and block or random copolymers of PBO, PBI and PBT.

Suitable bis(trihalomethyl) organic compounds for use in the process of the invention include any organic compound having a divalent organic moiety with at least two trihalomethyl groups pendant thereto. The divalent organic moiety preferably comprises no more than about 18 carbons, more preferably no more than about 12 carbons and most preferably no more than about carbons. It may be aliphatic, but is preferably aromatic and is more preferably a carbocyclic aromatic group. If aliphatic, it is preferably an alkyl group. If aromatic, it is preferably a single ring or two unfused rings joined by a single bond. Examples of suitable organic moieties are found in U.S. Pat. No. 4,533,693 from column 12, line 10 to column 13, line 30 and from column 14, line 60 to column 16, line 40, which is incorporated herein by reference. Halogens in the trihalomethyl group are preferably either fluorine, chlorine or bromine and are more preferably chlorine.

Examples of suitable bis(trihalomethyl) organic compounds include α,α,α,α',α',α'-hexachloro-p-xylene, 1,3-bis(trifluoromethyl)benzene, 1,4-bis(trifluoromethyl)benzene, and 3,5-bis(trifluoromethyl)bromobenzene. The trihalomethyl groups are preferably bonded to the divalent organic moiety in para- position with respect to each other. If the divalent organic moiety comprises two unfused rings, one trihalomethyl group is preferably bonded to each ring para- to the other ring. Most preferably, the compound is α,α,α,α',α',α'-hexachloro-p-xylene.

Bis(trihalomethyl) organic compounds can be synthesized by any suitable method, such as by halogenation of organic compounds containing pendant methyl groups. Aromatic compounds having two pendant methyl groups, such as xylenes, are commercially available or can be synthesized as a mixture of isomers by known processes such as Friedel-Crafts alkylation, for instance as described in Morrison et al., *Organic Chemistry*, pp. 377-382, which is incorporated herein by reference.

The polyphosphoric acid preferably has a $P_2O_5$ content by weight of at least about 70 percent, more preferably at least about 75 percent and preferably has a $P_2O_5$ content of at most about 90 percent, more preferably at most about 85 percent. Preferably, polyphosphoric acid is the only mineral acid employed in the process of the invention. However, other acids, such as sulfuric acid or methanesulfonic acid may be used in small amounts in admixture with polyphosphoric acid, so long as such acids do not comprise more than about 15 percent by weight of the acid mixture.

In step (a) of the process of the invention, a bis(trihalomethyl) organic compound is contacted with a polyphosphoric acid under reaction conditions sufficient to convert at least about 25 mole percent of the trihalomethyl groups present to carboxylic acid or carboxylate groups. The molar percentage of trihalomethyl groups so converted is preferably at least about 50 percent, more preferably at least about 75 percent, and most preferably at least about 95 percent.

This reaction step (a) may be carried out under any suitable conditions by simply combining the bis(trihalomethyl) organic compound with polyphosphoric acid, and stirring or otherwise agitating the mixture until a sufficient percentage of the trihalomethyl groups have converted to carboxylic acid or carboxylate groups. Preferably, the bis(trihalomethyl) organic compound is heated with stirring in the polyphosphoric acid at a temperature in the range of from about 100° C. to about 180° C. The rate of conversion of carboxylic acid and/or carboxylate groups typically varies with the temperature of the reaction. For example, under laboratory scale, batch reactor processing, conversion of 95 percent or more of the trihalomethyl groups may be accomplished in about 4 hours at 150° C. and in about 2 hours at 180° C. Complete conversion (greater than 95 percent) may be visually determined, since the bis(trihalomethyl) compound typically undergoes sublimation during the reaction. An example of a more precise method of following the progress of the reaction is to quench the reaction with water, extract the remaining bis(trihalomethyl) organic compound into a suitable organic solvent, such as chloroform, and use a suitable analytical technique, such as gas chromatography, to determine the quantity of the unconverted bis(trihalomethyl) organic compound.

The bis(trihalomethyl) organic compound and the polyphosphoric acid may be combined in any suitable proportions, so long as there is a molar excess of acid groups, but the acid is preferably employed in an amount sufficient to provide the desired concentration of PBZ polymer in a solution in the polyphosphoric acid following the completion of all steps necessary to prepare the PBZ polymer. For example, PBZ is typically prepared in a solution of polyphosphoric acid, and the polymer is kept dissolved in the acid until used for fabrication, such as by extrusion to form a film or a fiber filament. Following extrusion, the polymer solution is coagulated and washed to remove most of the polyphosphoric acid. Although the desired acid concentration for the PBZ polymer solution will depend on the handling requirements necessary for fabrication, for fibers and film extrusion it is preferably employed in an amount sufficient to provide a final polymer concentration in the range of from about 6 weight percent to about 16 weight percent. Since large amounts of the polyphosphoric acid must be employed to reach such a polymer concentration, it is of course possible to add a portion of the polyphosphoric acid during step (b) of the process of the invention or thereafter (so long as a molar excess is employed during step (a)), but this practice may be less desirable since it involves extra process steps for addition of the polyphosphoric acid.

Suitable aromatic compounds containing two o-amino-basic moieties for use in step (b) of the process of the invention include any compound containing an aromatic group with two o-amino-basic moieties pendant thereto. The aromatic group may be any aromatic ring or ring system. Size is not critical as long as the aromatic group is not so big that it prevents the copolymerization of the compound in which it is incorporated. The aromatic group preferably comprises no more than about 18 carbon atoms, more preferably no more than about 12 carbon atoms and most preferably no more than about 6 carbon atoms, not including any organic substituent on the aromatic group. They may be heterocyclic but are preferably carbocyclic and more preferably hydrocarbyl. If they are heterocyclic, they are preferably nitrogen-containing heterocycles. They may comprise a single aromatic ring, a fused ring system or an unfused ring system. The aromatic groups preferably comprises a single ring.

The aromatic group may contain substituents which are stable in polyphosphoric acid, such as halogens, phenyl sulfone moieties, alkoxy moieties, aryloxy moieties or alkyl groups, but they preferably have no substituents other than those specified hereinafter. If they contain alkyl substituents, those substituents preferably comprise no more than about 6 carbon atoms.

The term "o-amino-basic moiety" as used herein refers to a moiety bonded to an aromatic group, which contains:
 (1) a first primary amine group bonded to the aromatic group and
 (2) a hydroxy, thiol or primary or secondary amine group bonded to the aromatic group ortho to said primary amine group.

It preferably comprises a hydroxyl, thiol or primary amine moiety, more preferably comprises a hydroxy or thiol moiety, and most preferably comprises a hydroxy moiety. If the o-amino-basic moiety comprises two amine groups, preferably both are primary amine groups. If the o-amino-basic moiety contains a secondary amine group, the secondary amine group may comprise an aromatic or an aliphatic group but preferably comprises an alkyl group. The secondary amine group preferably comprises no more than about 6 carbon atoms, more preferably no more than about 4 carbon atoms and most preferably no more than about 1 carbon atom.

Monomers comprising an aromatic group and two o-amino-basic moieties are well-known and are described, for example as Type I monomers in U.S. Pat. No. 4,533,693, columns 17–24. Of course, a mixture of those monomers may be used to provide a random copolymer. The most preferred monomers containing o-amino-basic groups and processes for making them are described in Lysenko, *High Purity Process for the Preparation of 4,6-Diamino-1,3-benzenediol*, U.S. Pat. No. 4,766,244 (Aug. 23, 1988) and in U.S. Pat. No. 4,533,693 in Table I, columns 19–21, which are incorporated herein by reference.

In step (b) of the process of the invention, the reaction mixture produced by step (a) is contacted with an aromatic compound having two o-amino-basic moieties under reaction conditions sufficient to form a polybenzazole. The monomers present (the carboxylate-, carboxylic acid-, and trihalomethyl-functional organic compounds, and the aromatic compound having two o-amino-basic moieties) will react under conditions already known for the synthesis of PBZ polymers, such as those described in U.S. Pat. No. 4,533,693 at column 42, line 61 to column 45, line 62 and in U.S. Pat. No. 4,772,678 at column 39 line 55 to column 48 line 56, which are incorporated herein by reference. The carboxylate-, carboxylic acid-, and trihalomethyl-functional organic compounds may be utilized as monomers containing "electron-deficient carbon groups," as referred to above. The molar ratio of electron-deficient carbon groups to o-amino-basic groups in the polymerization reaction mixture will depend on the desired molecular weight of the polymer (which is proportional to its intrinsic viscosity). To achieve the highest possible molecular weight, such molar ratio is preferably about 1:1, although it has been observed that up to a 5 percent excess of electron-deficient carbon groups may be present in the polymerization reaction mixture without significant reduction in molecular weight, since compounds containing such groups dissolve and/or react more slowly than those containing o-amino-basic groups.

The polymerization reaction takes place in polyphosphoric acid which can dissolve or maintain in suspension the reagents and the polymer. The phosphorous pentoxide content of the polyphosphoric acid is preferably controlled as described in U.S. Pat. No. 4,533,693 from column 42, line 61 to column 43, line 18. The initial phosphorous content is preferably between about 63 percent and about 83.3 percent and the final phosphorous pentoxide content is preferably between about 82 percent and about 86 percent.

The reaction preferably takes place under a vacuum or under an inert atmosphere, for instance, a nitrogen atmosphere, helium atmosphere or argon atmosphere. The temperature of the reaction is not critical as long as the reaction proceeds and the reagents and solvent are stable. The reaction temperature preferably does not reach 250° C., more preferably does not reach 220° C. and most preferably does not reach 210° C. The reaction proceeds only very slowly at low temperatures. The reaction temperature is preferably always greater than 0° C. The maximum temperature of the reaction preferably reaches at least about 50° C., more preferably at least about 90° C., more highly preferably at least about 150° C. and most preferably at least about 190° C.

The polymers produced by this process comprise repeating units identical to the repeating mer units produced by known methods for synthesizing PBZ polymers. Such polymers are illustrated in U.S. Patent 4,533,693 and particularly at column 10, lines 1–35, which are incorporated herein by reference. The polybenzazole polymer is preferably polybenzoxazole. Each repeating polymer unit preferably complies with Formula I in column 10, lines 5–20 of U.S. Pat. No. 4,533,693. The polymers produced are preferably rigid rod PBZ polymers produced from copolymerizing monomers. The intrinsic viscosity of the final PBZ polymer is preferably at least about 5, more preferably at least about 20, and most preferably at least about 32. The intrinsic viscosity may be determined using capillary viscometers by extrapolation of $\eta_{rel} - 1/c$ and in $\eta_{rel}/c$ to zero concentration, using freshly distilled methanesulfonic acid as the solvent.

The bis(trihalomethyl) organic compounds are not moisture sensitive and need not be sealed from atmospheric moisture prior to use. Furthermore, they do not need to be micronized and can be used in particles having an average size greater than 10 microns. Polymers made from particles averaging at least about 50 microns or even about 100 microns in size can have viscosities of at least about 10 dL/g, more preferably at least about 20 dL/g and most preferably at least about 32 dL/g.

Furthermore, the reaction of monomer containing trihalomethyl groups does not generate water, which lowers the $P_2O_5$ concentration of the polyphosphoric acid in which the reaction occurs, as other monomers do. Therefore, the need to adjust the $P_2O_5$ content of the polyphosphoric acid may be lessened or eliminated, depending upon the initial $P_2O_5$ content of the acid.

The polymer dope produced by the process of the present invention can be spun to form useful fibers or extruded to form useful films as described in U.S. Pat. No. 4,533,693, columns 82–84 or in Chenevey et al., *Process for Preparing Shaped Articles of Rigid Rod Heterocyclic Liquid Crystalline Polymers*, U.S. Pat. No. 4,606,875 (Aug. 19, 1986) which are incorporated herein by reference. The fibers and films have high tensile strength and modulus as well as a high resistance to organic solvents and to thermal degradation.

ILLUSTRATIVE EMBODIMENTS

The following example is for illustrative purposes only and is not intended to limit the scope of either the specification or the claims. Unless stated otherwise, all parts and percentages are given by weight.

EXAMPLE 1

Synthesis of Poly(phenylenebenzo-bis-oxazole) Using α,α,α,α',α',α'-Hexachloro-p-xylene α,α,α,α',α',α'-Hexachloro-p-xylene is reduced to a powder having an average particle size of at least 50 to 100 microns by striking it with a hammer in a cloth. The (9.0 g, 28.8 mmoles) is mixed with 40.0 g of polyphosphoric acid having a $P_2O_5$ content of 83.5 percent. The temperature is raised to 150° C. and the mixture is stirred for 4 hours. Sublimed hexachloroxylene is heated to melt and falls back into the pot. The mixing and heating is then continued at 180° C. for an additional 2 hours, and the mixture (a viscous paste) is then cooled to 60° C. 4,6-Diamino-resorcinol di(hydrogen chloride) (5.24 g, 24.6 mmoles) is added to the kettle and heated at 70° C. for 2 hours, 90° C. for 18 hours, 120° C. for 4 hours, 150° C. for 4 hours, 170° C. for 18 hours, and 190° C. for 6 hours. A very viscous polymer dope is obtained. The intrinsic viscosity of the polymer in methanesulfonic acid at about 25° C. is 24 dL/g.

The above experiment is repeated and the intrinsic viscosity of the polymer in methanesulfonic acid at about 25° C. is 30 dL/g.

What is claimed is:

1. A process for synthesizing polybenzazole polymers comprising:
   (a) contacting an organic compound having two pendant trihalomethyl groups with a polyphosphoric acid under reaction conditions sufficient to convert at least about 25 mole percent of the trihalomethyl groups present to carboxylic acid or carboxylate groups, forming a reaction mixture thereby; and
   (b) contacting the reaction mixture with an aromatic compound having two o-amino-basic moieties under reaction conditions sufficient to form a polybenzazole polymer.

2. The process of claim 1 wherein:
   (a) the aromatic group of the aromatic compound contains no more than about 18 carbon atoms;
   (b) the divalent organic moiety of the organic compound is either an aromatic group containing no more than about 18 carbon atoms or an alkyl group containing no more than about 12 carbon atoms;
   (c) all aromatic groups are either carbocyclic or nitrogen heterocycles;
   (d) the process is carried out under vacuum or inert atmosphere; and
   (e) the temperature of the process is between about 0° C. and about 250° C.

3. The process of claim 2 wherein each aromatic group comprises no more than about 12 carbon atoms, each o-amino-basic moiety comprises a hydroxy group or a thio group, and each halogen in each trihalomethyl group is chlorine, fluorine, or bromine.

4. The process of claim 3 wherein each halogen in each trihalomethyl group is chlorine.

5. The process of claim 4 wherein:
   (a) the divalent organic moiety is an aromatic group;
   (b) the first monomer comprises two o-amino-basic moieties and the second monomer comprises two electron-deficient carbon groups;
   (c) each o-amino-basic moiety consists of a primary amine group and a hydroxy group; and
   (d) the maximum temperature of the reaction is between about 50° C. and about 210° C.

6. The process of claim 5 wherein the bis(-trihalomethyl) organic compound is $\alpha,\alpha,\alpha,\alpha',\alpha',\alpha'$-hexachloroxylene having an average particle size greater than about 10 microns.

7. The process of claim 6 wherein each aromatic group comprises no more than about 12 carbon atoms and each o-amino-basic moiety comprises a hydroxy group or a thio group.

8. The process of claim 7 wherein:
   (a) the divalent organic moiety is an aromatic group;
   (b) the first monomer comprises two o-amino-basic moieties and the second monomer comprises two electron-deficient carbon groups;
   (c) each o-amino-basic moiety consists of a primary amine group and a hydroxy group; and
   (d) the maximum temperature of the reaction is between about 50° C. and about 210° C.

* * * * *